United States Patent [19]

Mohri et al.

[11] Patent Number: 4,729,258
[45] Date of Patent: Mar. 8, 1988

[54] DIFFERENTIAL ACTUATOR

[75] Inventors: Naotake Mohri, Aichi; Nagao Saito, Tokyo; Kuniharu Miura; Yoshihiko Yanai, both of Aichi, all of Japan

[73] Assignees: Naotake Mohri, Aichi; Mitsubishi Denki Kabushiki Kaisha, Tokyo, both of Japan

[21] Appl. No.: 82,959

[22] Filed: Aug. 6, 1987

Related U.S. Application Data

[63] Continuation of Ser. No. 840,767, Mar. 18, 1986, abandoned.

[30] Foreign Application Priority Data

Mar. 19, 1985 [JP] Japan .................. 60-55069
Mar. 19, 1985 [JP] Japan .................. 60-55070

[51] Int. Cl.⁴ .......................................... F16H 37/08
[52] U.S. Cl. .......................................... 74/675
[58] Field of Search ............... 74/675, 665 A, 665 B, 74/665 C, 665 D, 665 E, 713, 714

[56] References Cited

U.S. PATENT DOCUMENTS

| | | | |
|---|---|---|---|
| 981,689 | 1/1911 | Rhodes | 74/675 |
| 1,706,276 | 3/1929 | Zweigbergk | 74/675 |
| 2,330,821 | 10/1943 | Finzi | 74/675 |
| 2,998,538 | 8/1961 | O'Mahony | 74/675 |
| 3,260,133 | 7/1966 | Mattson | 74/675 |
| 3,386,694 | 6/1968 | Boyle | 74/675 |
| 4,233,858 | 11/1980 | Rowlett | 74/675 |

FOREIGN PATENT DOCUMENTS

| | | | |
|---|---|---|---|
| 335176 | 4/1921 | Fed. Rep. of Germany . | |
| 356516 | 7/1922 | Fed. Rep. of Germany . | |
| 986538 | 8/1951 | France . | |
| 1125987 | 11/1956 | France | 74/675 |
| 1348428 | 12/1963 | France | 74/675 |
| 50-24661 | 3/1975 | Japan . | |
| 52-67452 | 6/1977 | Japan . | |
| 54-27660 | 3/1979 | Japan . | |
| 59-140940 | 8/1984 | Japan . | |
| 1041 | of 1908. | United Kingdom | 74/675 |

Primary Examiner—Rodney H. Bonck
Assistant Examiner—David A. Testardi
Attorney, Agent, or Firm—Bernard, Rothwell & Brown

[57] ABSTRACT

A differential actuator including a pair of unit actuators enclosed in a housing is provided. Rotational shafts of the unit actuators support bevel gears in opposed relation to each other. These bevel gears constitute a differential mechanism conjointly with two differential gears which are interconnected rotatably. Rotation of the differential gears around the axis of the bevel gears is taken out to the exterior as an output of the actuator.

1 Claim, 10 Drawing Figures

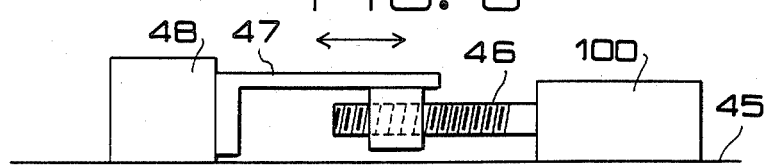
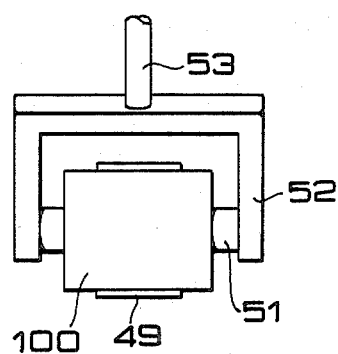
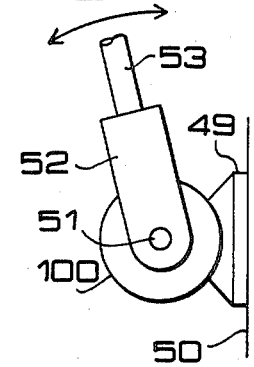
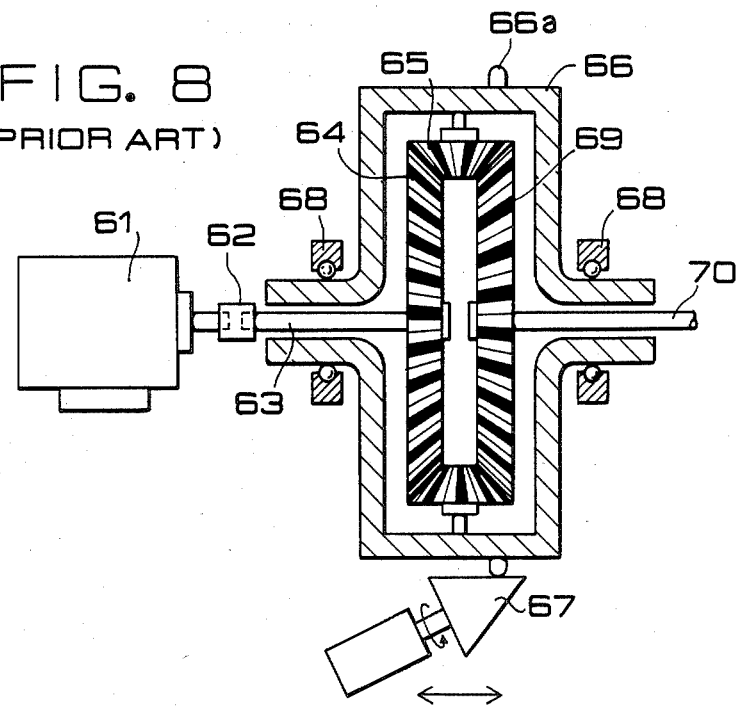

DIFFERENTIAL ACTUATOR

This is a continuation of application Ser. No. 840,767 filed Mar. 18, 1986, now abandoned.

BACKGROUND OF THE INVENTION

1. Field of the Invention

The present invention relates to an actuator and more particularly to a structure of an integral type differential actuator comprising two unit actuators and a differential mechanism, capable of attaining a wide speed range from zero to a desired speed. The actuator of the present invention is advantageously applicable as a drive source for an arm of an industrial robot.

2. Description of the Prior Art

One of the generally known differential actuators is shown in FIG. 8, in which the reference numeral 61 denotes an electric motor; numeral 62 denotes a coupling attached to a shaft end of the motor 61; numeral 63 denotes an input shaft connected to the coupling 62; numeral 64 denotes an input-side gear mounted on a distal end of the input shaft 63; and numeral 65 denotes a differential gear attached to a box 66 through a bearing, the rotation of the box 66 being controlled by a speed governor 67 which is in contact with a contact member 66a. Numeral 68 denotes a bearing which supports the box rotatably, and numeral 69 denotes an output-side gear mounted on a driven end of an output shaft 70 and connected to the differential gear 65.

In speed control, for example in the case of a Leonard thyristor control, a DC motor is used and the speed is changed by controlling the armature voltage or the field current. Alternatively, speed can be controlled by the actuator of FIG. 8 wherein, the input-side gear 64 is rotated by the motor 61 connected to the input shaft 63 through the coupling 62 as shown in the figure to thereby rotate the differential gear 65 connected to the gear 64. At this time, the differential gear 65 not only rotates on its own axis but also rotates together with the box 66 because it is connected to the box. Therefore, the speed of the box 66 can be controlled by changing the peripheral speed of the speed governor 67 and consequently the rotating speed of the output shaft 70 is controlled through the output-side gear 69.

Since the conventional actuator as a speed change mechanism is constructed as above, the speed control range is practically not larger than 1:3000 and problems such as torque ripple at low speeds and backlash have been involved therein.

SUMMARY OF THE INVENTION

It is an object of the present invention to provide an improved differential actuator free of such drawbacks as torque ripple at slow rotation and backlash at the time of forward-reverse switching.

In one aspect of the present invention, a differential actuator includes first and second unit actuators each having a rotational shaft capable of being rotated in a forward or reverse direction at a desired speed; a housing which accommodates therein first and second unit actuators so that the rotational shafts of the unit actuators are aligned with and opposed to each other at ends thereof with a predetermined spacing; and a differential mechanism connected to the rotational shafts of the first and second unit actuators and functioning to rotate an output member at a speed corresponding to a relative rotating speed difference between the two rotational shafts.

Preferably, the differential mechanism is provided with two bevel gears mounted on the two unit actuators in a coaxially opposed relation to each other, and also provided with two differential gears each engaged with the bevel gears. The differential gears are interconnected rotatably about their own axes and also rotatably along a circle, the center of which is disposed at the rotational center of the bevel gears. The rotation of the differential gears along the circle is taken out as an output of the differential actuator.

In the actuator of the invention, since the output thereof corresponds to the difference in the rotational speed between the two unit actuators, the speed ranges from zero to an upper limit of one of the unit actuators, thus theoretically having an infinitely large speed control ratio. Besides, even when the output shaft is at zero speed, the unit actuators are rotating at high speeds and hence, there is no fear of seizure of the unit actuators and also a torque ripple at a low speed scarcely appears on the output shaft.

BRIEF DESCRIPTION OF THE DRAWINGS

FIG. 6 is a schematic side view of the actuator of the invention as applied to a pusher;

FIG. 7(A) is a front view showing an example of using the actuator of the invention for driving a robot arm;

FIG. 7(B) is a side view thereof; and

FIG. 8 is a longitudinal sectional view of a conventional differential actuator.

DETAILED DESCRIPTION OF THE PREFERRED EMBODIMENTS

Figure 1:
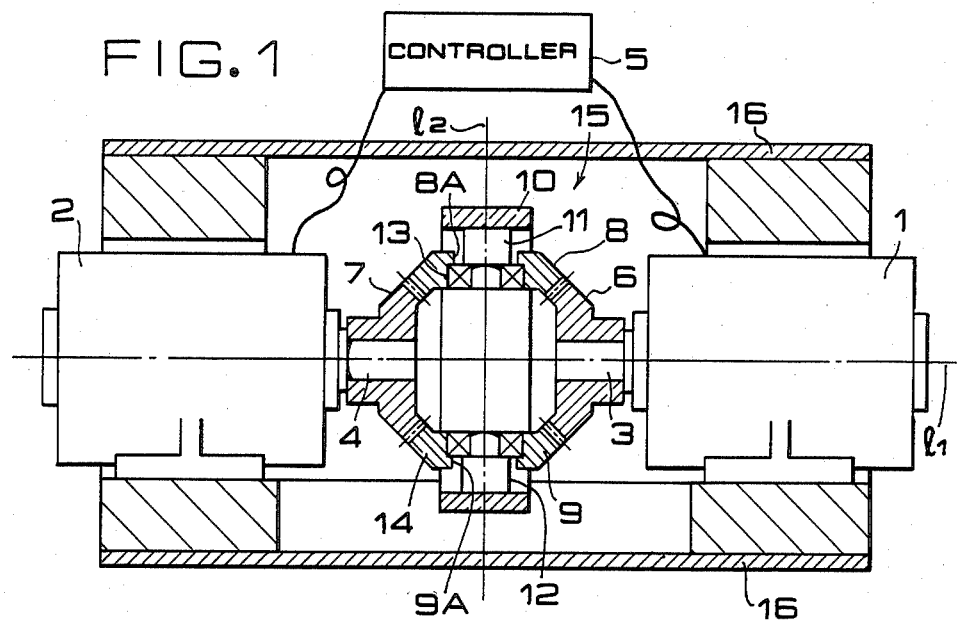
FIG. 1 is a longitudinal sectional view of a differential actuator according to the present invention.

Referring to the drawings, a differential actuator according to the present invention is shown in FIG. 1, in which the reference numerals 1 and 2 denote first and second unit actuators having first and second drive shafts 3 and 4 which are located on the same axis 11 and opposed to each other with a predetermined space therebetween. Numeral 5 denotes a control means for controlling the first and second unit actuators to rotate the first and second drive shafts 3 and 4 in forward and reverse directions and also at a variable rotating speed.

Numerals 6 and 7 denote first and second bevel gears fixed at ends of the first and second drive shafts 3 and 4, respectively, the bevel gears 6 and 7 being formed in the same shape and same size.

Numerals 8 and 9 represent a pair of bevel gears or a third bevel gears assembly which are positioned on an axis 12 perpendicular to the axis 11 and which are in mesh with the bevel gears 6 and 7. The bevel gears 8 and 9 are centrally formed with axially extending holes 8A and 9A.

Figure 2:
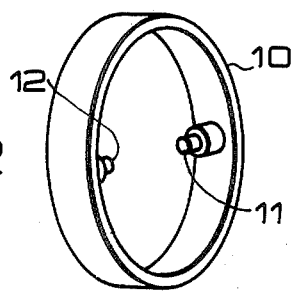
FIG. 2 is a perspective view of a differential belt pulley used in the actuator of FIG. 1.

Numeral 10 denotes a ring-like differential belt pulley. As best shown in FIG. 2, a pair of radially inwardly extending engaging shafts 11 and 12 are formed oppositely on an inner peripheral surface of the differential belt pulley 10. The engaging shafts 11 and 12 are engaged with bearings 13 and 14 mounted in the holes 8A and 9A of the bevel gears 8 and 9 to support the bevel gears rotatably.

A differential mechanism 15 is constituted by the bevel gears 6, 7, 8, 9, differential belt pulley 10 and engaging shafts 11, 12. It transmits power to the driven side through a belt (not shown) passed round the belt pulley 10, at a rotating speed corresponding to the sum or difference of the rotating speeds of the drive shafts 3 and 4. These components are enclosed in a housing 16 to constitute a single actuator.

The actuator constructed as above operates in the following manner.

It is here assumed that the rotational direction of the first drive shaft 3 and that of the second drive shaft 4 are the same, that is, the two are rotating in opposite directions with respect to the differential mechanism 15. If the rotating speed of the first drive shaft 3 is $\theta A$ and that of the second drive shaft 4 is $\theta B$, $\theta A$ being larger than $\theta B$, the bevel gears 8 and 9 revolve along the peripheral edge of the bevel gear 7 while rotating on their own axes on the basis of a relative difference of the speeds $\theta A$ and $\theta B$, so that the differential belt pulley 10 rotates at the same speed as the revolving speed of the bevel gears 8 and 9. In this case, the rotating speed of the belt pulley 10, namely, the speed $\theta o$ taken out from the differential mechanism 15, is obtained from the following equation (1):

$$\theta o = \tfrac{1}{2}(\theta A - \theta B) \qquad (1)$$

Where $\theta A$ is smaller than $\theta B$, the differential belt pulley 10 rotates in a direction opposite to the above, so that the differential mechanism 15 outputs a rotational speed in a direction reverse to the above. When the rotating speeds of the drive shafts 3 and 4 are equal to each other, $\theta o = O$ from the equation (1) and the rotational speed output from the differential mechanism 15 becomes zero, that is, the rotation stops. Thus, even when the drive shafts 3 and 4 are used in an ordinary rotational speed range, there is obtained a slow rotation output, and therefore the change of speed from a slow rotation region can be done smoothly and easily. When the rotating direction of one of the drive shafts 3 and 4 is reversed, that is, when both drive shafts rotate in the same direction with respect to the differential mechanism 15, the speeds $\theta A$, $\theta B$ and $\theta o$ are in the following relationship (2):

$$\theta o = \tfrac{1}{2}(\theta A + \theta B) \qquad (2)$$

From the above equation (2) it is seen that if a drive shaft (e.g. the first drive shaft 3) rotating at a low speed and a drive shaft (4) rotating at a high speed are combined, the rotating speed is increased an amount corresponding to the sum of the two.

On the other hand, if the rotational speeds $\theta A$ and $\theta B$ of the first and second drive shafts 3 and 4 are made equal to each other, the bevel gears 8 and 9 will not rotate (on their own axes) but revolve in mesh with the first and second bevel gears 6 and 7 as if they were integral with those first and second bevel gears, and the differential belt pulley 10 will also rotate integrally with them. The output value during rotation is equal to the sum of outputs of both unit actuators 1 and 2.

As is apparent from the above, the speed change range of the differential actuator is such a wide range as shown by the following equation (3):

$$-\tfrac{1}{2}(\theta A + \theta B) \sim +\tfrac{1}{2}(\theta A + \theta B) \qquad (3)$$

Moreover, since a desired rotational speed of the output shaft is obtained by combining the rotational directions of the first and second drive shafts 3 and 4 with the difference in rotational speed between the two, there can be attained a good response characteristic in obtaining the desired speed.

Figure 3:
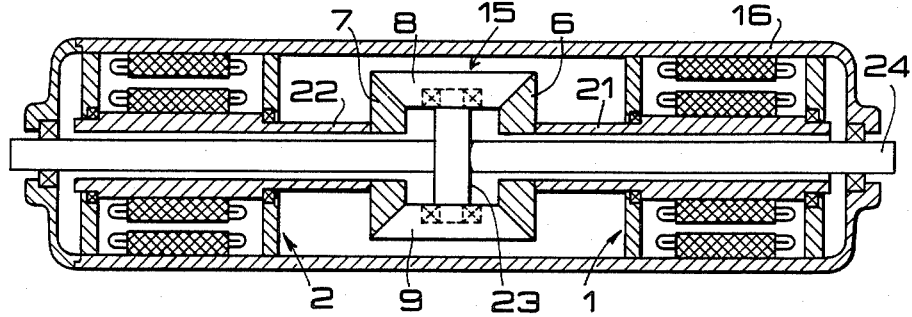
FIG. 3 is a longitudinal sectional view of another differential actuator according to the present invention.

Referring now to FIG. 3, there is illustrated a modified embodiment of the present invention, in which two unit actuators 1 and 2, which may be the same as in FIG. 1, have hollow shafts 21 and 22, respectively, and are disposed within a housing 16 so that the hollow shafts 21 and 22 are in alignment with each other. A differential mechanism 15 used herein has a function equal to that of the differential mechanism used in the actuator of FIG. 1, but is different from the latter in that bevel gears 8 and 9 are supported not by a belt pulley but by both ends of a differential shaft 23. The differential shaft 23 is fixedly connected to an output shaft 24 which extends through the bores of the hollow shafts 21 and 22 and which is supported by the housing 16.

In the embodiment of FIG. 3, the difference in rotational speed between the bevel gears 6 and 7 brings about rotation of the differential shaft 23 about the axis of the bevel gears 6 and 7 at a speed proportional to the value of such difference, and this rotation is transmitted to the output shaft 24.

Figure 4A:
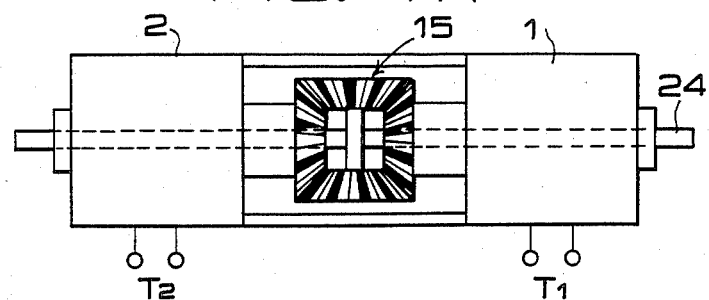
FIG. 4(A) is a plan view of the actuator shown in FIG. 3.
Figure 4B:
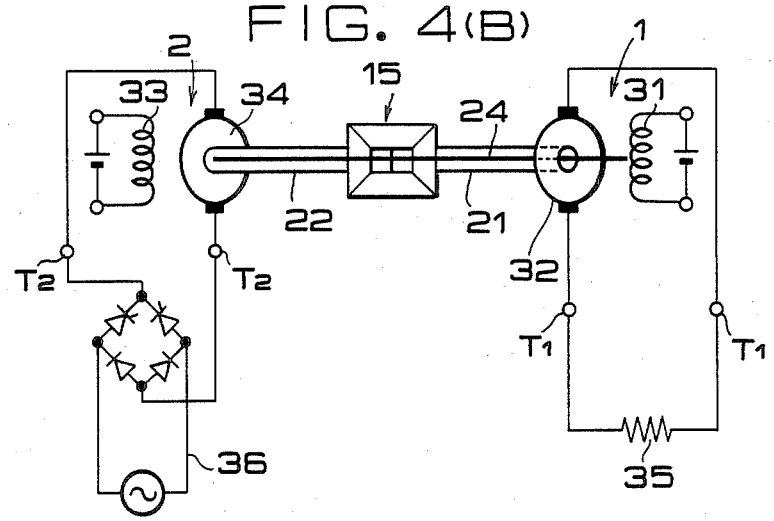
FIG. 4(B) illustrates an electrical connection of the actuator shown in FIGS. 3 and 4(A)

In both embodiments described above, each of the actuators 1 and 2 may be constituted by a motor which also serves as a generator when the rotational shaft is forcibly rotated by an external power source. In FIGS. 4(A) and 4(B) which illustrate an actuator having such type of motors as unit actuators 1 and 2, the first unit actuator 1 is provided with a field circuit 31 and an armature 32, the armature 32 being electrically connected to terminals indicated at T1, and the second actuator 2 is provided with a field circuit 33 and an armature 34, the armature 34 being electrically connected to terminals indicated at T2. As an example, the operation of the actuator will now be explained in the case where a power generation controlling resistor 35 is connected to the terminals T1 and a power supply circuit 36 consisting of an AC source and a rectifier circuit is connected to the terminals T2. Provided, however, that any of the power generation controlling resistor and the power supply circuit may be connected to the terminals T1 and T2. Therefore, the actuator can be operated in one of the following four operation modes:

| | Operation Mode of Actuator | |
|---|---|---|
| | Terminal | |
| Mode | T1 | T2 |
| 1 | power supply | power supply |
| 2 | power supply | power generation |
| 3 | power generation | power supply |
| 4 | power | power |

| Mode | Operation Mode of Actuator Terminal T1 | T2 |
| --- | --- | --- |
| | generation | generation |

The arrangement of FIG. 4(B) corresponds to mode 3. In mode 3, where the rotational speeds of the first and second unit actuators 1 and 2 are equal to each other, the rotational speed of the output shaft 24 is zero and its output torque is maximum.

Figure 5:
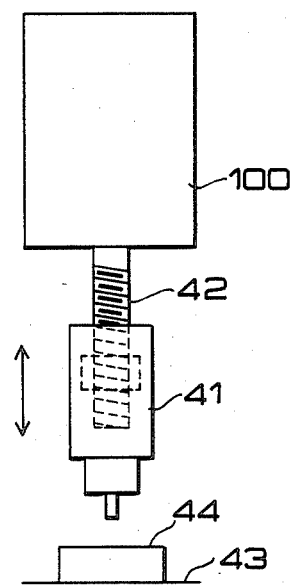
FIG. 5 is a schematic plan view of the actuator of the invention as applied to driving a main shaft of an electrical discharge machine.

The actuator of the present invention can be utilized in an extremely wide range of use. FIG. 5 shows an example in which the actuator 100 of the invention is used for driving a main shaft 41 of an electrical discharge machine. The main shaft 41 is connected to the output shaft of the actuator 100 through a ball screw 42 and it is capable of approaching and going away from a work 44 supported on a head 43. The rise-fall speed ratio of the main shaft during electrical discharge machining is required to be about 10,000, which is satisfied by the actuator of the present invention.

FIG. 6 shows an example in which the actuator 100 of the invention is applied to a pusher in a conventional automatic machine. The actuator 100 is fixed to a base 45 and it acts to push out a work 48 to a desired position through a head 47 which is connected to the output shaft of the actuator through a ball screw 46. Such operations as slowly moving the head 47 forward and rapidly moving it backward can be realized easily.

Further, FIGS. 7(A) and 7(B) show an articular portion of an industrial robot provided with the actuator 100 of the invention. The actuator 100 is fixed to a suitable base 50 through a bracket 49. An output shaft 51 of the actuator is fixedly connected to a bracket 52, and by its rotation in one direction or an opposite direction about the axis thereof, the bracket 52 and arm 53 attached thereto are swung.

In the application examples shown in FIGS. 5, 6, 7(A) and 7(B) and all of the possible application examples similar thereto, the actuator of the present invention permits rotation of its output shaft in any desired direction at any desired speed, and its output torque can be adjusted in a wide range.

What is claimed is:

1. A differential actuator comprising:
   first and second motors each having a hollow rotational shaft capable of being rotated in forward and reverse directions at a desired speed;
   a tubular housing which contains therein said first and second motors and which rotatably supports the hollow rotational shafts of the motors;
   said hollow shafts being aligned along a common axis with each other and opposing each other at inner ends thereof at a predetermined spacing:
   a differential mechanism connected to the inner ends of said hollow rotational shafts of said first and second motors and having an output shaft extending coaxially through the lumens of the hollow rotational shafts and which output shaft rotates at a speed corresponding to a relative rotating speed difference between said hollow rotational shafts;
   said motors and said differential mechanism being substantially enclosed within the interior of said housing to form an integrated assembly;
   said output shaft having end portions extending past outer ends of the hollow rotational shafts with the end portions of the output shaft being rotatably supported by the housing; and
   at least one of said end portions of the output shaft forming a variable speed drive member.

* * * * *